United States Patent [19]
Horowitz

[11] Patent Number: 6,110,389
[45] Date of Patent: Aug. 29, 2000

[54] FILTRATION UNIT

[76] Inventor: Amikam Horowitz, 3666 Stoer Rd., Shaker Heights, Ohio 44122

[21] Appl. No.: 09/164,976

[22] Filed: Oct. 1, 1998

Related U.S. Application Data

[60] Provisional application No. 60/061,514, Oct. 10, 1997.

[51] Int. Cl.[7] .............................. B01D 37/00; C02F 3/04; C02F 3/06
[52] U.S. Cl. .......................... 210/794; 210/617; 210/618; 210/792; 210/793; 210/797; 210/798; 210/150; 210/151; 210/248; 210/196; 134/25.1
[58] Field of Search ..................................... 210/151, 150, 210/219, 221.2, 616, 618, 248, 767, 791, 792, 793, 794, 795, 797, 798, 800, 617, 615, 194, 196; 134/25.1

[56] References Cited

U.S. PATENT DOCUMENTS

| | | |
|---|---|---|
| 5,055,186 | 10/1991 | Van Toever ............................... 210/150 |
| 5,126,042 | 6/1992 | Malone . |
| 5,232,586 | 8/1993 | Malone . |
| 5,397,466 | 3/1995 | Lin . |
| 5,429,740 | 7/1995 | Van Der Herberg . |
| 5,445,740 | 8/1995 | Malone . |
| 5,468,392 | 11/1995 | Hanson et al. . |
| 5,486,291 | 1/1996 | Todd et al. . |
| 5,487,829 | 1/1996 | Safferman et al. . |
| 5,494,754 | 2/1996 | Unterman et al. . |
| 5,525,230 | 6/1996 | Wrigley et al. . |
| 5,549,828 | 8/1996 | Ehrlich . |
| 5,573,671 | 11/1996 | Klein . |
| 5,770,880 | 6/1998 | Malone . |
| 5,945,005 | 8/1999 | Junius et al. ............................. 210/786 |

*Primary Examiner*—Robert J. Popovics
*Attorney, Agent, or Firm*—Fay, Sharpe, Fagan, Minnich & McKee, LLP

[57] ABSTRACT

A filtration tank (1) for purification of polluted water includes a chamber (12). Upper and lower filtration screens (20, 22) are supported within the chamber. Filtration particles (18) are confined between the upper and lower screens. Polluted water enters the chamber through an inlet (26), passes through the screens and the filtration particles and exits the chamber through a purified water outlet (28). Periodically, the inlet and outlet are closed and the water in the chamber is drained through a drain outlet (32). Nozzles (42, 45) spray cleaning fluid over the filter particles and screens to dislodge trapped dirt.

21 Claims, 4 Drawing Sheets

FILTRATION UNIT

This application claims the priority of U.S. Provisional Application Ser. No. 60/061,514, filed Oct. 10, 1997.

BACKGROUND OF THE INVENTION

The present invention relates to the filtration arts. It finds particular application in conjunction with the filtering of suspended matter from waste water, either as an independent system or in conjunction with a separate biofiltration system which removes dissolved organic and inorganic materials from the water. It is to be appreciated, however, that the invention is also applicable to other water treatment processes where removal of suspended material or dissolved organic and inorganic matter is desirable, such as the treatment of water for use in fish tanks or chemical processes or for treatment of bodies of water such as ponds, streams and small lakes and waste water from industrial or mining operations.

Treatment of waste waters has become increasingly important in view of stricter environmental regulations concerning industrial and municipal wastes. Because of regulations concerning contaminant disposal, it is desirable to degrade contaminants in the waste water prior to disposal. Treatment of water for reuse has also increased, as a means of providing purified water for industrial, domestic and aquaculture systems, such as fish farms. Biological filtration systems, incorporating a filtration medium for physically trapping particulate matter, together with microorganisms for degrading certain contaminants, are widely used in water treatment.

Commonly used biofiltration systems employ a packing material which becomes coated with microorganisms immobilized in a biofilm layer. One such system is described in U.S. Pat. No. 5,494,574 to Unterman et al. The coated packing material simultaneously traps suspended particles, while the microorganisms act on the biodegradable components of the waste water.

Filtration systems suffer from downtime problems due to clogging of the packing material with solid material from the waste water. A number of methods have been developed for removing this trapped material. In one method, the packing material is subjected to turbulent flow, created by mechanical mixers, such as propellers, as shown in U.S. Pat. Nos. 5,445,740 and 5,126,042, to Malone. Alternatively, a circulating system continuously circulates the packing material through the chamber, as shown in U.S. Pat. No. 5,494,574 to Unterman et al.; U.S. Pat. No. 5,573,671 to Klein; and U.S. Pat. No. 5,429,740 to Van Der Herberg. In yet another system, intermittent air scouring of the entire bed is used to remove the trapped material, as described in U.S. Pat. No. 5,487,829 to Safferman et al. and U.S. Pat. No. 5,232,586 to Malone.

Such methods for cleaning of the filter suffer from a number of drawbacks. Mechanical methods, such as propeller agitation, tend to damage the biofilm. Air scouring methods are less destructive of the film, but less effective at cleaning the filtration media.

Accordingly, it has been considered desirable to develop a new and improved water filtration system that does not require extensive down time for cleaning the filter and employs a cleaning process which leaves biofilms deposited on the filtration particles intact. The present invention provides a new and improved apparatus and method for filtration of dissolved and suspended matter from water which overcomes the above referenced problems and others.

SUMMARY OF THE INVENTION

In accordance with one aspect of the present invention an apparatus for purification of water is provided. The apparatus includes a filter chamber, a water inlet through which unpurified water enters the chamber, a water outlet through which purified water exits the chamber, and a filter system. The filter system includes a first filtration screen disposed within the chamber adjacent to the water inlet, a second filtration screen disposed within the chamber adjacent to the water outlet, and filtration media trapped between the first and second screens. The water inlet, water outlet, and first and second filtration screens are configured such that unpurified water entering the tank through the water inlet passes through the first filtration screen, the filtration media and the second filtration screen before exiting the tank through the water outlet. The apparatus further includes a drain outlet for selectively draining water from the chamber. The drain outlet is sized for rapidly draining the tank.

In accordance with more limited aspects of this aspect of the present invention, the apparatus further includes one, more preferably, a plurality of nozzles on an interior wall of the tank which selectively direct a cleaning fluid into the chamber. The nozzles may be placed adjacent to the filter media, or so as to direct the cleaning fluid upwardly from below the first filtration screen, or both. The nozzles may be spaced vertically or horizontally adjacent to the filtration media, or both. The filtration media may include particles which are coated with a biofilm. The apparatus may further include a drain valve for selectively closing the drain outlet during filtration and for selectively opening the drain outlet during cleaning of the filter system. Optionally, a pump is provided for selectively drawing water through the chamber. Inlet and outlet valves may also be provided for selectively closing the inlet and outlet during cleaning of the filter system. The first filtration screen may include a coarse mesh layer and a fine mesh layer.

In accordance with another aspect of the present invention, a method of purifying water is provided. The method includes flowing dirty water through filtration media to filter suspended materials from the dirty water and selectively cleaning the filtration media. The filtration media is cleaned by interrupting the flow of dirty water to the filter media, rapidly draining water from the filter media, thereby dislodging the filtered suspended materials therefrom, and recommencing the flow of dirty water to the filter media.

In accordance with more limited aspects of this aspect of the present invention, the method further includes sequentially repeating the steps of interrupting the flow of dirty water, draining water from the filter media, and recommencing the flow of dirty water. The step of cleaning the filtration media may further include spraying a cleaning fluid into the filtration media to wash the filtered suspended materials from the filtration media. This may include spraying a portion of water that has been filtered into the filtration media. The step of cleaning the filtration media may also include trapping the filtration media between upper and lower screens. In this embodiment, the step of cleaning the filtration media may further include spraying the cleaning fluid into the filtration media from jets spaced between the first and second screens or spraying a cleaning fluid onto the lower screen from below the lower screen.

One advantage of the present invention is the provision of a filtration system which can be cleaned in a relatively short time.

Another advantage of the present invention is the provision of a filtration system in which inner layers of biofilms, deposited on the filtration particles, are not removed by the cleaning process.

Another advantage of the present invention is the provision of a cleaning process which refreshes the biofilm by removing excess outer layers of the biofilm that grow on top of inner layers, thus keeping the biofilm layer lean and effective.

Another advantage of the present invention is the provision of nozzles which spray a cleaning fluid into the filtration particles to dislodge trapped debris.

Still another advantage of the present invention is the provision of a filtration system which can treat both suspended particulate matter and dissolved organic matter.

Yet another advantage of the present invention is that it enables the removal of sludge containing nitrogen and phosphorus from bodies of water, which could otherwise contribute to eutrophication of the water.

Still other benefits and advantages of the present invention will become apparent to those skilled in the art upon a reading and understanding of the following detailed specification.

BRIEF DESCRIPTION OF THE DRAWINGS

The invention takes form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENTS

Figure 1:
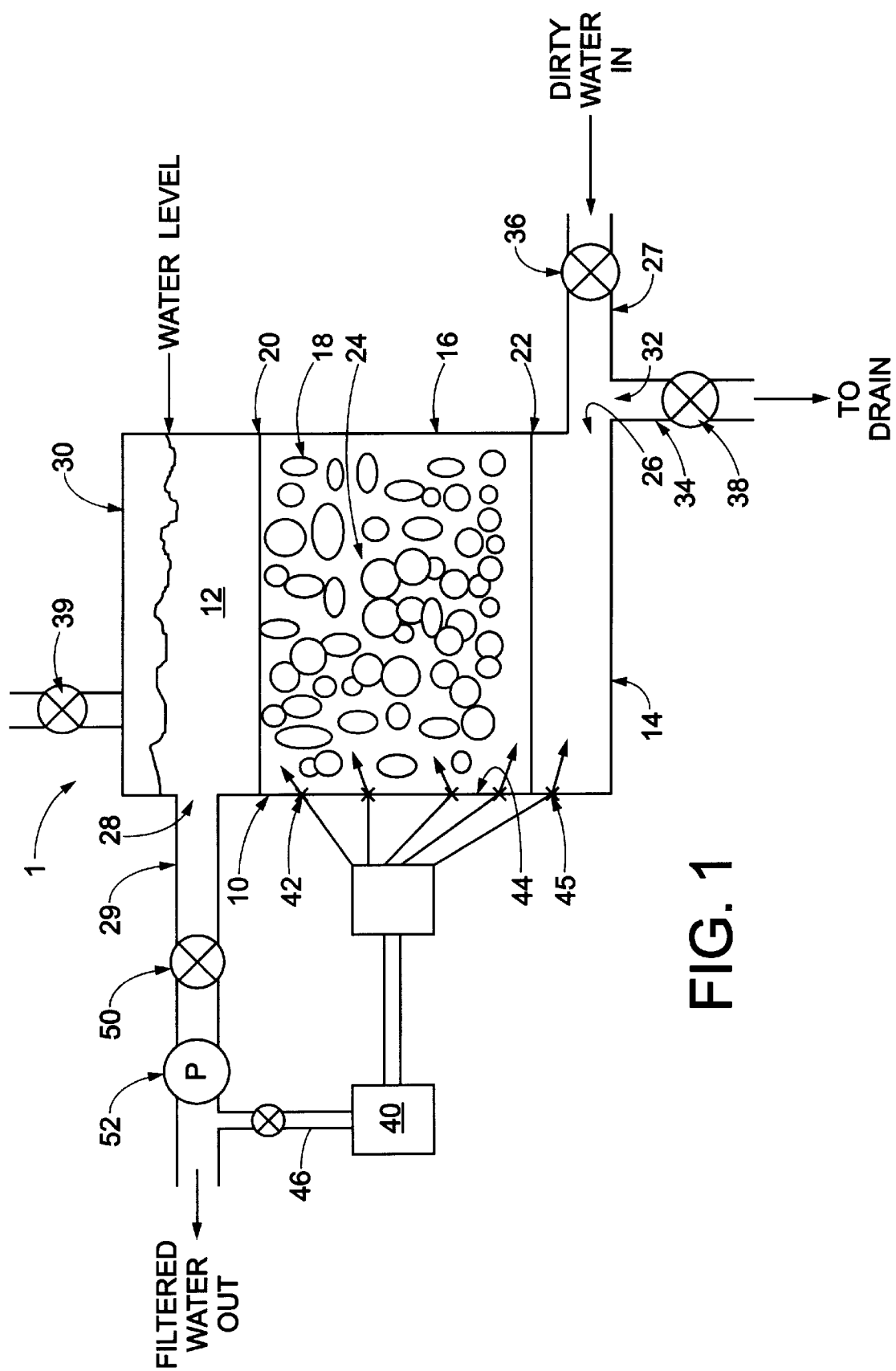
FIG. 1 is a schematic side view of the filtration unit in accordance with the present invention.

Referring now to the drawings, wherein the showings are for purposes of illustrating preferred embodiments of the invention only and are not for purposes of limiting same, FIG. 1 shows a self-cleaning filtration unit or tank 1. The filtration tank 1 includes a peripheral wall 10 which defines a chamber 12. The peripheral wall 10 includes a base 14 and a side wall 16, which extends from a peripheral edge of the base. The chamber 12 contains filtration media, such as filtration particles 18. Upper and lower filtration screens 20 and 22, respectively, are supported within the chamber 12. The screens confine the filtration particles 18 within a region 24 of the chamber 12 to form a bed.

An unpurified water inlet 26, receives unpurified source water from a fluid inlet line 27. The inlet 26 is preferably defined by an opening in a lower portion of the peripheral wall 10 of the chamber below the lower screen 22, such as in the base 14 of the tank, or in the side wall 16 adjacent to the base 14. An upper, or purified water outlet 28 delivers purified water from the tank to a water outlet line 29. The outlet 28 is defined by another opening in an upper portion of the peripheral wall 10 of the tank, at a position above the upper screen 20, such as in the side wall 16, or in an optional top wall or removable cover 30 of the tank 1. A drain outlet 32, may be defined by a third opening in the base 14 or side wall 16 in the tank, or, as shown in FIG. 1, the drain outlet is defined in the water inlet line 27. The drain outlet is fluidly connected to a drain line 34.

The filter is cycled between filtration and cleaning portions of the cycle. In the filtration portion of the cycle, source water, or other liquid to be purified, enters the tank through the inlet 26. The source water passes through the lower screen 22, then through the filtration particles 18 and the upper screen 20, before exiting the tank through the upper outlet 28 as filtered water. Suspended matter in the liquid, such as particulates or sludge, is trapped on or between the filtration particles 18, in particular, on the lower sides of the particles. The filtration particles are held against the upper screen by their buoyancy and the upward pressure of the water.

At intervals, the filtration portion of the cycle is interrupted and a cleaning portion of the cycle takes place. In the cleaning portion of the cycle the filtration particles 18 are backwashed to clean the filtration particles and lower screen 22 of accumulated debris. More specifically, an inlet valve 36, preferably disposed in the inlet line 27, selectively seals the inlet 26 to stop the flow of source water, or other liquid to be purified, into the tank 1. A drain valve 38, preferably disposed in the drain line 34, selectively opens to drain part or all of the liquid remaining in the chamber out through the drain outlet at the completion of the filtration portion of the cycle. When a top cover 30 is used, a relief valve 39, disposed in either the top cover, or in the outlet line 29, adjacent to the inlet 26, is opened during drainage of the chamber, to equalize pressure within the chamber.

Preferably, the cross sectional area of the drain line and the valve are selected so that the liquid drains rapidly from the chamber, when the drain valve is opened. This creates suction forces on the remaining liquid and particles within the chamber and creates vortices which cause the particles to move. The filtration particles 18, which are normally held against the upper screen by their buoyancy, are drawn down towards the lower screen as the liquid leaves the chamber. This downward movement of the particles and sudden contact with the lower screen agitates the particles, dislodging accumulated debris. However, the forces on the particles are generally insufficient to completely destroy biofilms which have built up on the surfaces of the particles, but are sufficient to remove the excess outer layers of the biofilm. The debris is carried by the exiting liquid to the drain.

Preferably, the backwash step is repeated to increase removal of the debris. Specifically, the drain valve 38 is closed after draining at least part of the liquid from the chamber. The inlet valve 36 is then opened to allow the chamber to refill with unfiltered liquid until the particles are once again carried by their buoyancy to a region adjacent to the upper screen 20. The inlet valve is then closed and the drain valve opened to drain the chamber again. This sequence of draining steps may be repeated several times to improve cleaning.

Optionally, an additional, spray-cleaning step is used to complete the removal of debris from the filtration particles and the screens. A source of cleaning fluid 40 supplies cleaning fluid to the chamber 12. More specifically, the source of cleaning fluid 40 supplies cleaning fluid to jets or nozzles 42 arranged within the chamber. The nozzles are preferably disposed adjacent to an inner surface 44 of the wall 16 of the tank. More preferably, the nozzles are also located adjacent to the filtration particles 18. The nozzles can be vertically spaced, as illustrated in FIG. 1, radially spaced around the periphery of the side wall 16 in the region 24, or both. Alternatively, or additionally, nozzles 42 are located adjacent to the top wall 30 of the tank. The nozzles 42 spray the cleaning fluid into the chamber 12 to remove trapped suspended matter from the filtration particles 18 and from the lower screen 22. Optionally, additional nozzles 45 are disposed adjacent the wall of the tank below the lower screen 22. These nozzles spray cleaning fluid upwardly for flushing debris that has accumulated on the lower screen.

Preferably, the cleaning fluid is water, such as part of the water previously purified by the filtration unit, or clean water from another source. The water is returned to the chamber 12 via a return line 46 from the outlet 28. The cleaning fluid is preferably pressurized such that the filtration particles 18 are agitated during the cleaning portion of the cycle. This removes trapped matter without dislodging biofilms from the filtration particles.

During the spray-cleaning step, the inlet valve 36 remains closed and the drain valve 38 selectively opens to allow the cleaning fluid to drain from the chamber 12 through the drain outlet. By adjusting the drain valve 38, the rate of draining of the cleaning fluid, and thus the level of the cleaning fluid in the chamber, is varied.

In a first part of the spray-cleaning step, the lower nozzles 45 spray cleaning fluid to flush away any debris that has accumulated at the bottom of the chamber 12. The drain valve 38 is fully open to allow the dirt and cleaning fluid to drain rapidly from the chamber.

In a second part of the spray-cleaning step, the drain valve 38 is closed, at least partially. If there is a top cover 30 on the system, an outlet valve 50 disposed in the outlet line 29 is closed at this stage to prevent purified water from returning into the chamber through the outlet line in cases where the purified water level is above the outlet of the chamber or where the filtration unit 1 is submerged. The relief valve 39 is opened to equalize pressure in the chamber. The nozzles 42 spray cleaning fluid into the chamber and over the filtration particles 18 and lower screen 22. Preferably, the drain valve 38 is adjusted to keep the level of the cleaning fluid between the upper and lower screens, 20 and 22. At the end of this stage, the supply of cleaning fluid to the nozzles 42 is switched off and the chamber 12 is drained of the cleaning fluid. Specifically, the drain valve 38 is opened fully and the chamber emptied rapidly to dislodge debris from the particles 18. Optionally, one or more additional flushing steps, using either cleaning fluid or unfiltered liquid, are carried out to improve cleaning.

The unit is then ready to recommence the filtration portion of the cycle. The drain valve 38 and relief valve 39 are closed and the inlet valve 36 and outlet valve 50 opened.

Figure 3:
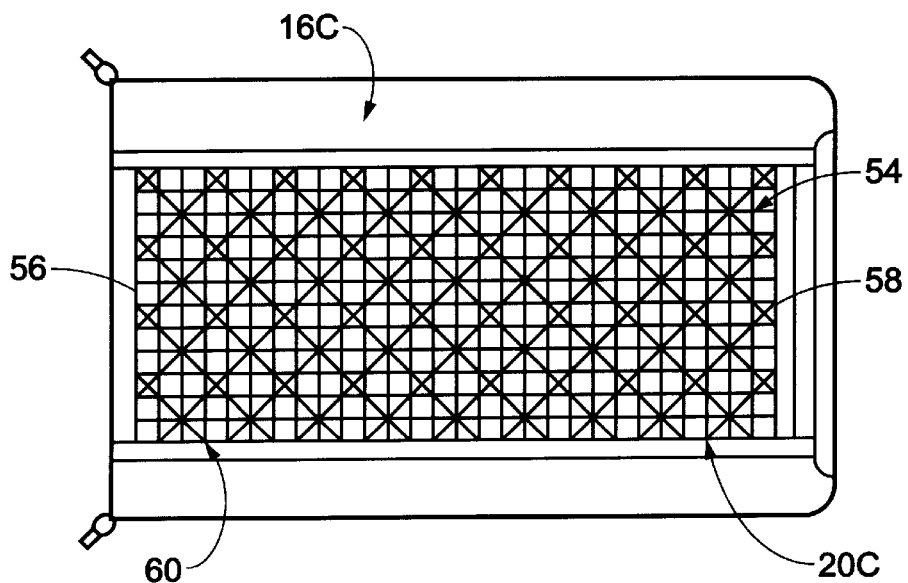
FIG. 3 is an enlarged schematic top view of the upper screen of FIG. 2.
Figure 4:
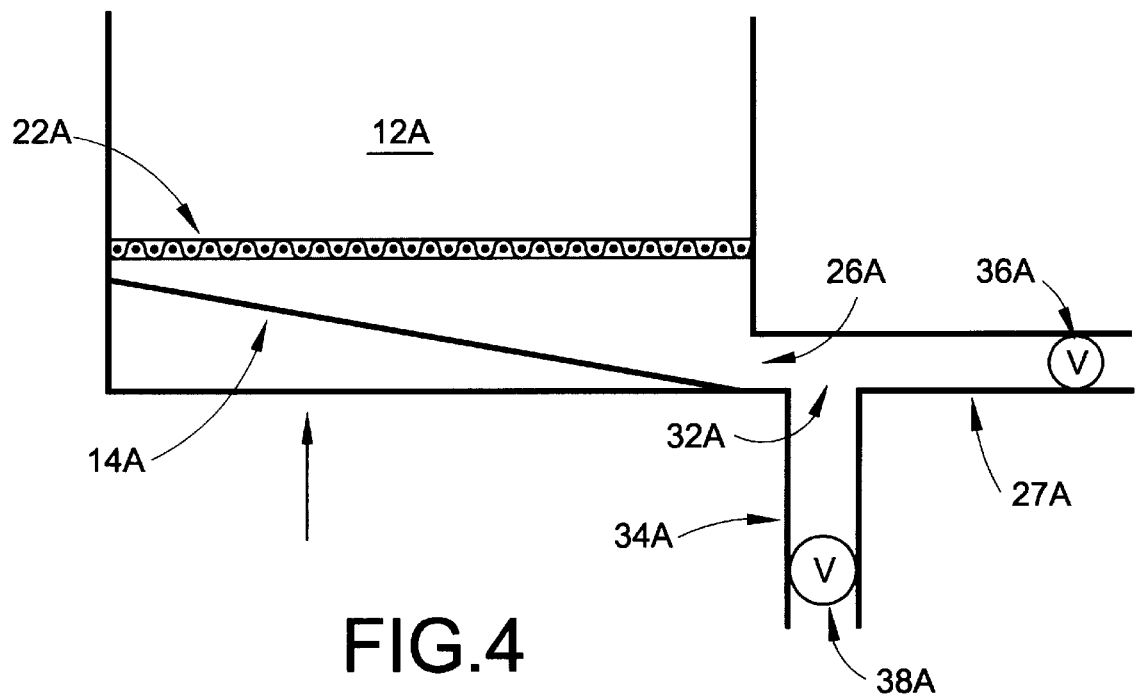
FIG. 4 is a schematic side view of an alternative embodiment of the filtration unit with a sloping base.
Figure 5:
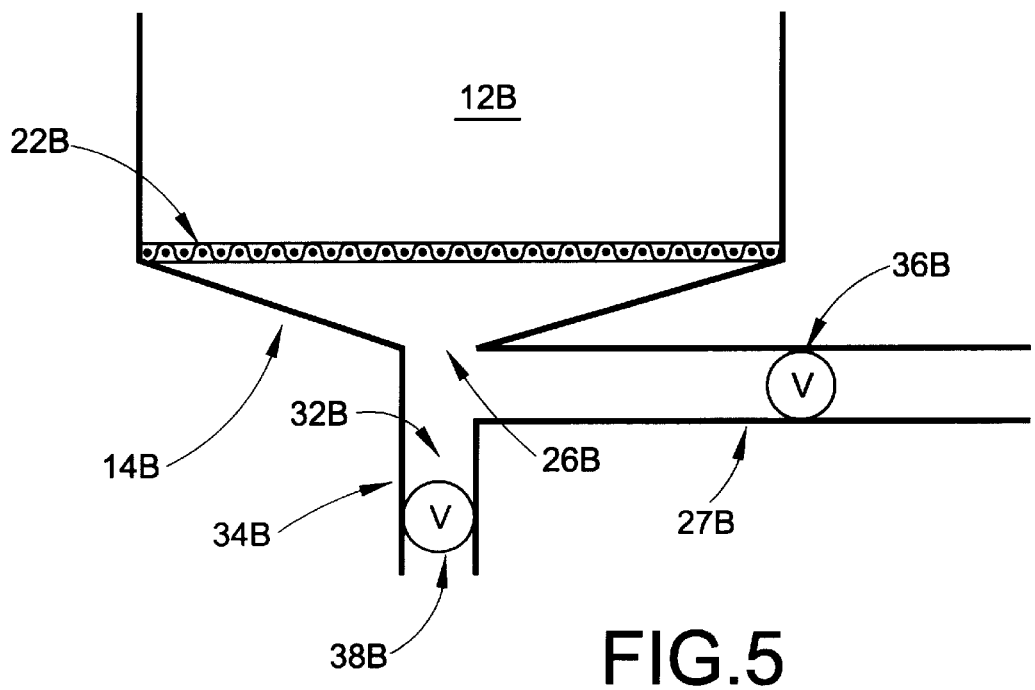
FIG. 5 is a schematic side view of another alternative embodiment of the filtration unit with a conical base; and, FIG. 6 is a schematic side view of an embodiment of the filtration unit using gravity feed.

Under certain operating conditions, the introduction of cleaning fluid is not necessary. By sizing the drain line 34 and the drain valve 38 appropriately, the water in the chamber 12 is rapidly drained from the chamber. This rapid draining effectively cleans the accumulated debris from among the filtration particles 18 and from under the lower screen 22. In alternative embodiments, the base 14 of the tank is optionally inclined to improve drainage. With reference to FIG. 4, a base 14A slopes downward toward an inlet 26A. In this embodiment, a drain outlet 32A is connected to an inlet line 27A, between an inlet valve 36A and a chamber 12A. In another embodiment, shown in FIG. 5, an inlet 26B is centrally located in a base 14B of the tank and the base is conically shaped. In this embodiment, the inlet 26B and a drain outlet 32B are preferably located adjacent to the lowest part of a chamber 12B. In a particularly preferred embodiment, shown in FIGS. 2 and 3, the tank is cylindrically shaped, with curved portions of the cylinder defining part of a base 14C and side walls 16C of the tank. It should be recognized that other configurations of the base 14, inlet 26 and drain outlet 32 are also envisaged. For example, the drain outlet 32, and inlet 26 may be located in different regions of the tank.

Optionally, the operation of the valves 36, 38, 39, and 50, and of the nozzles 42 and 45 is controlled, such as by a microprocessor, in order that cleaning and filtration portions of the cycle proceed in turn, automatically. The timing of the cleaning and filtration portions of the cycle may be preselected, depending on anticipated contaminant levels. Alternatively, the timing may be varied, depending on the level of build up of contaminants on the filter.

In certain cases, for example, where the supply water is below the level of the outlet 28, or the filtered water needs to be raised to a higher level, or the filter is under water, a pump 52 fluidly connected with the inlet 26 or outlet 28 pumps water through the chamber 12 during the filtration portion of the cycle. FIG. 1 shows the pump 52 in the outlet line 29. It should be appreciated, however, that the pump may also be located in the inlet line 27. When a pump is used in outlet line 29, the top cover 30 preferably seals the top of the tank so that the pump is able to draw the filtered water from the tank by suction.

Figure 6:
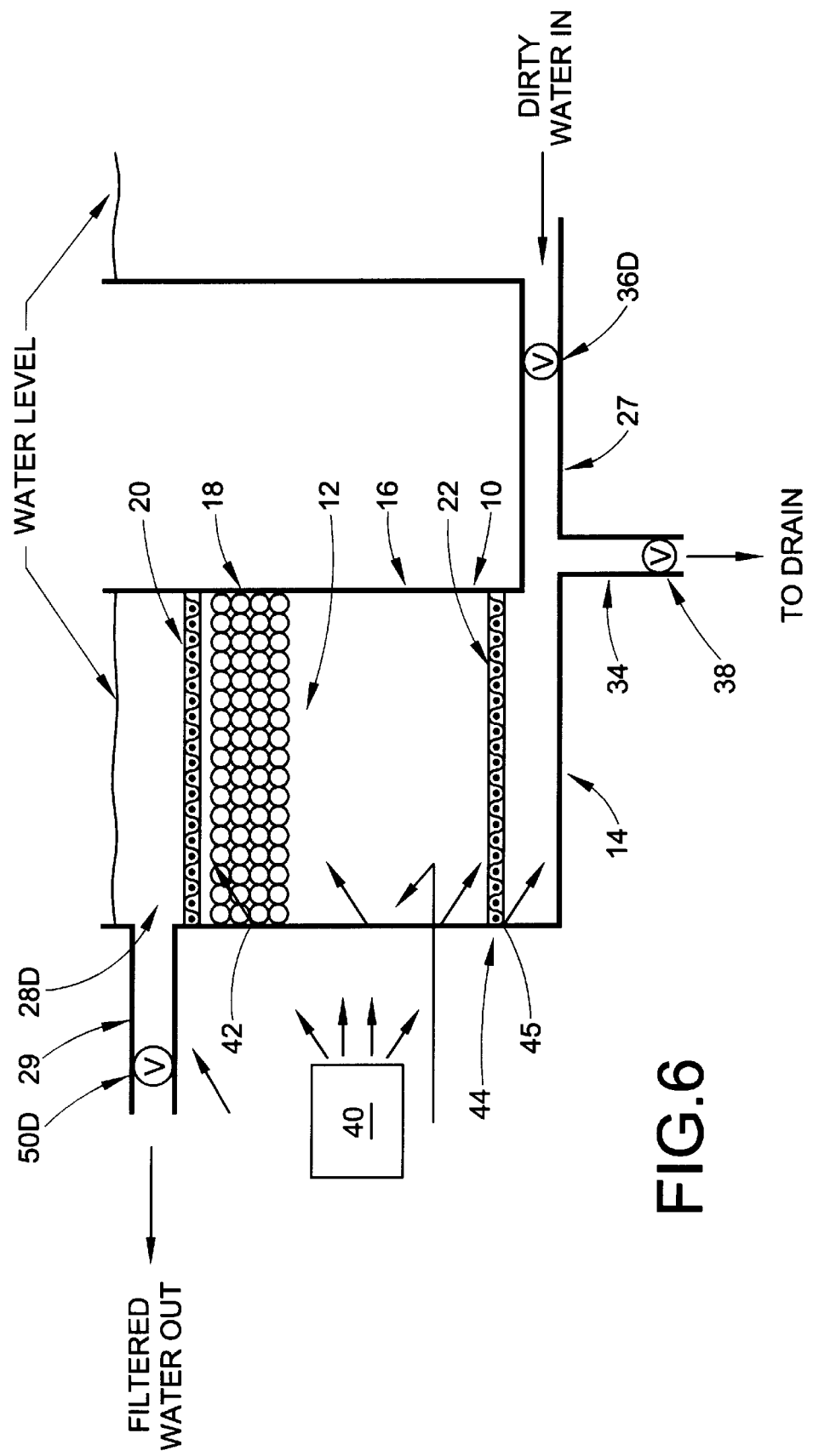

For gravity feed systems, a pump is not needed to transport the supply water into the tank and deliver clean fluid from the tank. As shown in FIG. 6, the level of the water in the tank, and the level of the source water, are higher than that of an outlet 28D. In this embodiment, the unit can operate without a top cover. Additionally, an outlet valve 50D may also be eliminated.

The filtration particles 18 comprise natural or synthetic particles, such as beads or pellets, reground plastic material or ceramic spheres. During the filtration portion of the cycle, suspended matter is trapped in pores created in and between the particles. Increasing the irregularity of the shape of the particles increases bacterial adhesion to the particles. The particles 18 are preferably constructed of a material of lower density than that of the liquid to be filtered such that the particles 18 float in the tank within the liquid to be purified. The particles 18 are pushed upward by buoyancy and held against the upper screen 20, without appreciable movement, leaving a small volume of the region 24 of the chamber between the screens free of floating particles 18.

Different size particles 18, alone or in combination, are selected according to the nature of the suspended material. The smaller the filtration particles 18, the smaller the minimum size of suspended matter that can be trapped. However, since cleaning of the particles becomes more difficult with decreasing particle size, the selection of particle dimensions is potentially limited by time and energy constraints on the cleaning portion of the cycle.

Optionally, the particles are coated with a desired coating. By selection of an appropriate coating or coatings, trapping of suspended and dissolved matter is improved. Certain coatings increase adhesion of suspended particles. Others selectively trap dissolved organic matter or react with the organic matter to form insoluble particles that are then trapped by physical means.

In one embodiment, the coating includes a biofilm for biodegradation of various contaminants. For example, for waste streams containing organic or inorganic matter which is metabolized by microorganisms, such as compounds containing carbon, nitrogen, phosphorus, sulfur, and iron atoms, the particles may be pre-coated with a biofilm of the appropriate live microorganisms prior to the operation of the filter. Alternatively, where such microorganisms are present in the water to be treated, these may be allowed to settle naturally on the particles 18 and thus provide a biofilm. In either case, particles having a rough surface or irregular shape are desirable in order to supply better protection for the attached microorganisms during the cleaning portion of the cycle.

Biofilms also serve to enhance the trapping of suspended matter by attaching the suspended matter to an outer layer of polysaccharides. Additionally, biofilms increase the trapping and biodegradation of dissolved organic matter, which would normally, on the basis of size, pass through the filter.

If desired, the outlet 28 can be fluidly connected with a second conventional filtration system, such as a carbon filter or biological filter (not illustrated).

With reference once again to FIGS. 2 and 3, upper and lower screens 20C and 22C serve to contain the filtration particles 18 within the chamber 12. The screen size therefore will determine the minimum size of the filtration particles 18. The lower screen 22C also serves to prevent some of the larger suspended matter from reaching the filtration particles 18. Screens 20C and 22C preferably include a mesh 54, such as a woven wire mesh. The minimum screen size of the mesh is limited by flow considerations and fouling. An optimum screen size for most filtration processes is therefore of the order of about 1 mm, although smaller screen sizes are appropriate when a high flow rate is not required and the suspended matter is of relatively small size.

Optionally, two or more layers of mesh material can be used in combination to form the mesh 54. For example, the lower screen 22 may include a lower, coarse mesh 56 which filters out larger particles and supports an upper, fine mesh 58. The upper fine mesh filters out some of the remaining smaller particles and retains the filtration media 18. For the upper screen 20C, the layers of mesh are reversed, with a coarse mesh 56' being positioned above a fine mesh 58'.

Figure 2:
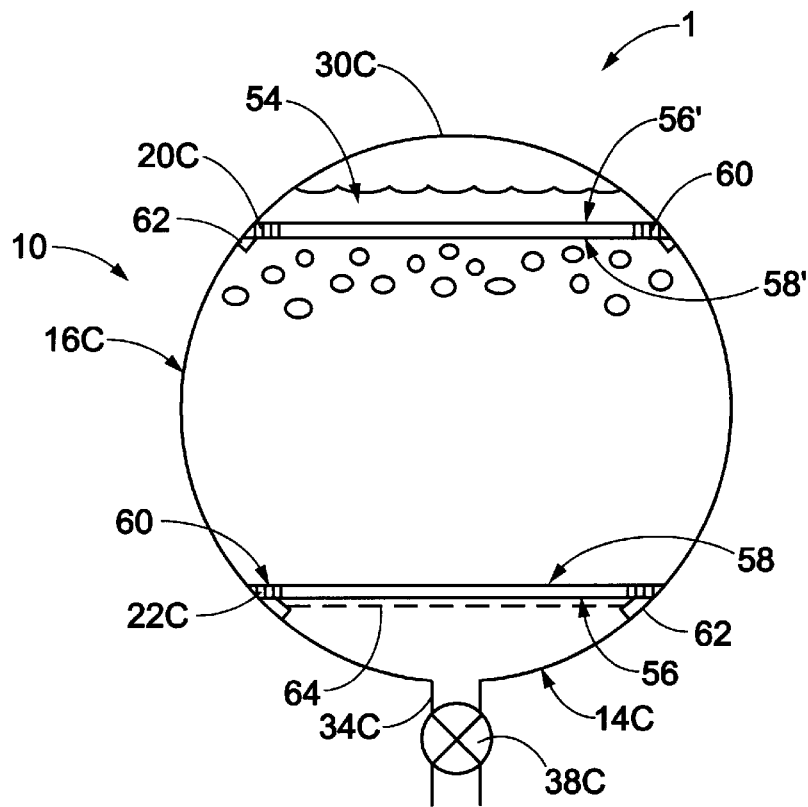
FIG. 2 is a schematic cross sectional view of another embodiment of the filtration unit in accordance with the present invention.

There are a number of ways of forming the screens 20, 22, 20C, and 22C. In the embodiment of FIGS. 2 and 3, each screen 20C, 22C includes a peripheral frame 60, to hold the mesh 54. In this embodiment, the screens 20C, 22C are securely fastened to the peripheral wall 10C of the tank 1 to aid retention of the filter particles. Securing members 62, such pipe stubs, releasably connect each screen to the side wall 16C of the tank.

In other embodiments, the securing members securing upper screen 20 are connected to the top wall 30 or a suitably positioned rim around the top of the tank 1, while the securing members securing lower screen 22 are connected to the base 14 or a lower rim of the tank. Alternatively, the screens 20 and 22 are free-standing or are retained in the tank 1 by other means. To support the weight of the filtration particles 18 and accompanying matter during cleaning of the particles, the lower screen 22 may include an additional support member 64, disposed below the mesh 54.

The peripheral wall 10 of the tank and screens 20 and 22 are preferably constructed of a material which is unreactive toward the liquid to be purified. One such suitable material is thermoplastic, although other materials are also contemplated.

The filtration tank has a variety of applications. It can be located above or below ground. It may also be submerged under water.

Cleaning of the filtration particles is achieved in a much shorter time than for many conventional cleaning systems. This increases the time that can be devoted to the filtration portion of the cycle, thus increasing the output of the filtration system. A short idle time is particularly important where the filtration system is used as a pre-filter for a biofilter such as a nitrification biofilter, or is itself used as a biofilter. Lack of flow through the biofilter during the cleaning step causes drastic changes in oxygen and nutrient levels and may cause temporary starvation of the biofilter microorganisms. Materials present in the biofilter during the cleaning portion of the cycle having a high BOD (Biological Oxygen Demand) exacerbate the depletion of oxygen. The interference in the nutrient and oxygen supply to the microorganisms of the biofilter reduces the efficiency of the microorganisms in biological filtration. For example, in the filtration of fish tank water, changes in feed levels and lack of oxygen during the cleaning portion of the cycle often results in a lowering of the removal rate of ammonia and nitrite. Optionally, one or more additional filtration systems is used, each one undergoing the cleaning portion of the cycle at a different time, so that an uninterrupted flow of purified liquid is supplied.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the preferred embodiments, the invention is now claimed to be:

1. An apparatus for purification of water, the apparatus comprising:
   a filter chamber;
   a water inlet through which unpurified water enters the chamber;
   a water outlet through which purified water exits the chamber;
   a filter system including:
      a first filtration screen disposed within the chamber adjacent the water inlet,
      a second filtration screen disposed within the chamber adjacent the water outlet, and
      filtration media trapped between the first and second screens, the water inlet, water outlet, and first and second filtration screens configured such that unpurified water entering the tank through the water inlet passes through the first filtration screen, the filtration media and the second filtration screen before exiting the tank through the water outlet;
   a source of cleaning liquid connected with the chamber for selectively supplying cleaning liquid to the chamber to clean the filtration media;
   a drain outlet for selectively draining water from the chamber, the drain outlet sized for rapidly draining the tank to clean the filter system; and
   at least one nozzle which selectively directs the cleaning liquid into the chamber wherein the at least one nozzle includes a plurality of spaced nozzles.

2. The apparatus of claim 1, wherein the at least one nozzle is disposed on an interior wall of the tank at a location which is adjacent the filter media.

3. The apparatus of claim 1, wherein the source of cleaning liquid includes a return line in fluid communication with the chamber.

4. The apparatus of claim 1, wherein the first filtration screen is sized to filter some of the particles from the unpurified water.

5. An apparatus for purification of water, the apparatus comprising:

a filter chamber;

a water inlet through which unpurified water enters the chamber;

a water outlet through which purified water exits the chamber;

a filter system including:
- a first filtration screen disposed within the chamber adjacent the water inlet,
- a second filtration screen disposed within the chamber adjacent the water outlet, and
- filtration media trapped between the first and second screens, the water inlet, water outlet, and first and second filtration screens configured such that unpurified water entering the tank through the water inlet passes through the first filtration screen, the filtration media and the second filtration screen before exiting the tank through the water outlet;

at least one nozzle which directs cleaning fluid upwardly into the chamber from below the first filtration screen; and a drain outlet for selectively draining water from the chamber, the drain outlet for draining the tank to clean the filter system.

6. The apparatus of claim 5, wherein the filtration media includes particles which are coated with a biofilm.

7. The apparatus of claim 5, further including a drain valve for selectively closing the drain outlet during filtration and for selectively opening the drain outlet during cleaning of the filter system.

8. The apparatus of claim 5, further including a pump for selectively drawing water through the chamber, the pump being fluidly connected with the water outlet.

9. The apparatus of claim 8, wherein the tank includes a peripheral wall and a top cover which define the chamber, and further including a relief valve which selectively opens during cleaning of the filter system to equalize pressure within the chamber.

10. The apparatus of claim 9, further including an outlet valve for selectively closing the outlet during cleaning of the filter system.

11. The apparatus of claim 5, further including an inlet valve for selectively closing the inlet during cleaning of the filter.

12. The apparatus of claim 5, wherein at least one of the first filtration screen and the second filtration screen includes a coarse mesh layer and a fine mesh layer, the fine mesh layer being positioned adjacent the filtration media.

13. The apparatus of claim 5, further including:

a top cover which seals an upper opening in the chamber.

14. A method of purifying water, the method comprising:

flowing dirty water through filtration media to filter materials from the dirty water; and selectively cleaning the filtration media by the steps of:

trapping the filtration media between upper and lower screens, interrupting the flow of dirty water to the filtration media, rapidly draining water from around the filtration media, causing the filtration media to drop from a region adjacent the upper screen so that the filtration media hits the lower screen, thereby dislodging the filtered materials therefrom, and spraying a cleaning liquid onto the filtration media to wash the filtered materials from the filtration media; and recommencing the flow of dirty water to the filtration media.

15. The method of claim 14, further including sequentially repeating the steps of interrupting the flow of dirty water, draining water from the filtration media, and recommencing the flow of dirty water.

16. The method of claim 14, wherein the cleaning liquid comprises a portion of water that has been filtered and the step of spraying a cleaning liquid into the filtration media includes:

spraying the portion of water that has been filtered into the filtration media.

17. The method of claim 14, wherein the step of cleaning the filtration media further includes:

spraying the cleaning liquid into the filtration media from jets spaced between the first and second screens.

18. The method of claim 14, wherein the step of rapidly draining the water form the filtration media includes:

spraying the cleaning liquid into the filtration media from jets spaced between the first and second screens.

19. The method of claim 14, further including, during the step of spraying the cleaning liquid onto the filtration media:

draining the cleaning liquid at a slower rate than during the step of rapidly draining water to maintain the cleaning liquid in contact with the filtration media.

20. A method of purifying water, the method comprising:

flowing dirty water through filtration media to filter materials from the dirty water; and, selectively cleaning the filtration media by the steps of:

interrupting the flow of dirty water to the filtration media;

rapidly draining water from the filtration media, thereby dislodging the filtered materials therefrom, spraying a cleaning fluid onto the lower screen from below the lower screen, and recommencing the flow of dirty water to the filtration media.

21. The method of claim 20, wherein the filtration media is disposed within a tank, the method further including:

submerging the tank in a source of the dirty water to be cleaned.

* * * * *